(12) United States Patent
Kalfayan et al.

(10) Patent No.: US 7,603,896 B2
(45) Date of Patent: Oct. 20, 2009

(54) FLUID FLOW MODEL AND METHOD OF USING THE SAME

(75) Inventors: Leonard J. Kalfayan, Houston, TX (US); William D. Wood, Spring, TX (US); Jennifer Cutler, Tomball, TX (US); Carolyn S. Devine, Spring, TX (US)

(73) Assignee: BJ Services Company, Houston, TX (US)

( * ) Notice: Subject to any disclaimer, the term of this patent is extended or adjusted under 35 U.S.C. 154(b) by 384 days.

(21) Appl. No.: 11/520,549

(22) Filed: Sep. 13, 2006

(65) Prior Publication Data

US 2007/0062273 A1    Mar. 22, 2007

Related U.S. Application Data

(60) Provisional application No. 60/717,671, filed on Sep. 16, 2005.

(51) Int. Cl.
*E21B 47/10*    (2006.01)

(52) U.S. Cl. .................................................. 73/152.18
(58) Field of Classification Search ............... 73/152.18
See application file for complete search history.

(56) References Cited

U.S. PATENT DOCUMENTS

| 4,868,751 | A | * | 9/1989 | Dogru et al. ................... 702/12 |
| 5,325,723 | A | * | 7/1994 | Meadows et al. ............. 73/794 |
| 5,868,030 | A | | 2/1999 | Brumley et al. |

* cited by examiner

*Primary Examiner*—Hezron Williams
*Assistant Examiner*—Rodney T Frank
(74) *Attorney, Agent, or Firm*—Jones & Smith, LLP; John Wilson Jones (57) ABSTRACT

A fluid flow model is comprised of one cross-flow style core holder and a multitude of standard style core holders, all connected by a concurrent combination of serial and parallel flow paths. The sum of these flow paths yields a fluid flow model that closely approximates a small radial slice of a conventional reservoir. The fluid flow model has particular applicability to estimate the requisite treatment fluid for use in acidizing as well as water control methods.

26 Claims, 9 Drawing Sheets

FLUID FLOW MODEL AND METHOD OF USING THE SAME

This application claims the benefit of U.S. patent application Ser. No. 60/717,671, filed on Sep. 16, 2005, herein incorporated by reference.

FIELD OF THE INVENTION

The present invention relates to a method and apparatus for determining certain fluid flow parameters for any porous media.

BACKGROUND OF THE INVENTION

Acidizing a hydrocarbon formation is the process of reacting an acid in the formation to enhance the flow of hydrocarbons to the wellbore. This can be through the dissolution of existing formation material or through the removal or bypass of blockage, often referred to as "damage to the well" which can be caused by natural or man-made conditions. Acidizing, or acid stimulation, opens up the channels around the wellbore, thereby improving the flow rate. When acid is injected into a formation, permeability is increased, thus enhancing the flow of hydrocarbons to the wellbore. This results in an increase or improvement in production from the formation.

Prior to introducing fluids into the formation, it is desirable to first determine fluid flow parameters by reservoir modeling techniques. Two key measured properties are porosity and permeability of the reservoir. The porosity of a material is the ratio of the aggregate volume of its void or pore spaces (i.e., pore volume) to its gross bulk volume and, in the case of an oil or gas reservoir, is a measure of the capacity within the reservoir rock which is available for storing oil or gas. The permeability of a material is a measure of the ability of the material to transmit fluids through its pore spaces and is inversely proportional to the flow resistance offered by the material. It is important that such fluid flow parameters be determined by reservoir modeling prior to commencement of treatment.

Porosity and permeability are determined by taking core samples from the reservoir site and carrying out well-defined measurement techniques on the samples. There are several techniques available for making such measurements. Effective radial modeling is difficult to perform due to constraints imposed by the amount of core material typically available. A true radial model would require very large blocks of reservoir material to effectively model flow patterns and stimulation properties of a given acid system. Since most reservoir coring operations generate 4" diameter (or smaller) cylindrical cores, obtaining large blocks of intact reservoir is in most cases impossible. Therefore, an improved method of radial stimulation reservoir modeling is desired.

SUMMARY OF THE INVENTION

The fluid flow model device of the invention is comprised of one cross-flow style core holder and a multitude of standard style core holders, all connected by a concurrent combination of serial and parallel flow paths. The sum of these flow paths yields a fluid flow model that closely approximates a small radial slice of a conventional reservoir.

The results of testing performed with the device of the invention can be scaled-up to simulate real world conditions by using a multiplier value that converts from the slice of reservoir examined to an entire cylinder of revolution around a wellbore. Once the volumes of treatment fluid have been ascertained via the model, actual field treatment volumes may be determined by ascertaining the length of the interval to be treated.

The fluid flow model of the invention also allows for diversion effectiveness to be evaluated as the test is performed, and can be used with any rigid permeable material.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

A design for reservoir modeling is disclosed which is more accurate than the methods of the prior art. In addition, the inventive modeling can be more readily scaled-up to the conditions in the field. The flow modeling test apparatus of the invention renders a more realistic depiction of the amount of treatment fluid needed by the operator, e.g., how much acid is needed to conduct an acidizing operation. The method has particular applicability in the estimation of treatment fluid for use in acidizing (including matrix acidizing and acid diversion) as well as water control treatment methods.

Typically, each of the referenced core holders discussed herein independently has an inner diameter of approximately 8 inches or less and a length of approximately 12 inches or greater. Typically, each of the cores has a diameter from about 1 to about 8 inches. (As used herein, the term "diameter" in relation to the core is synonymous with the outer diameter of the core.) Cores and core holders of other diameters and/or lengths may be employed. For instance, one or more cores may have a diameter of 2 or 4 inches. It will be understood by one of skill in the art that the diameter of a core and the inner diameter of a compatible core holder are numerically the same. For instance, the inner diameter of a core holder for a 1 inch diameter core is 1 inch, a 2 inch inner diameter core holder is compatible for a 2 inch core, a 4 inch inner diameter core holder is compatible for a 4 inch core, etc.

The multi-cell fluid flow methodology of the invention consists of first introducing a drilling fluid into a primary core zone through a cross flow core holder wherein the drilling fluid is permitted to flow across the face and through the first core and leaking material through the core, by means of a cross-flow style core holder. The cross flow core holder allows for the simulation of filter cake buildup on the exposed core face, thereby modeling actual field conditions during drilling.

A treatment fluid may then be injected into the primary core zone to remove filter cake from the core face and travel through the first core, stimulating the core as it passes through. Upon exiting from the first core, the treatment fluid passes through a mass flow meter. The fluid is then divided and the divided streams pass, via separate flow lines, into distinct successive or contiguous cores. Treatment fluid is then passed through the secondary core zone and exits the secondary cores. Upon exiting from the secondary cores, one or more of the streams may further be partitioned, after being passed through a mass flow meter, and passed into one or more distinct successive or contiguous tertiary core zones. It is understood that the methodology may be continued to successive or contiguous quaternary core zones and so on depending upon the desires and needs of the operator.

Figure 1:
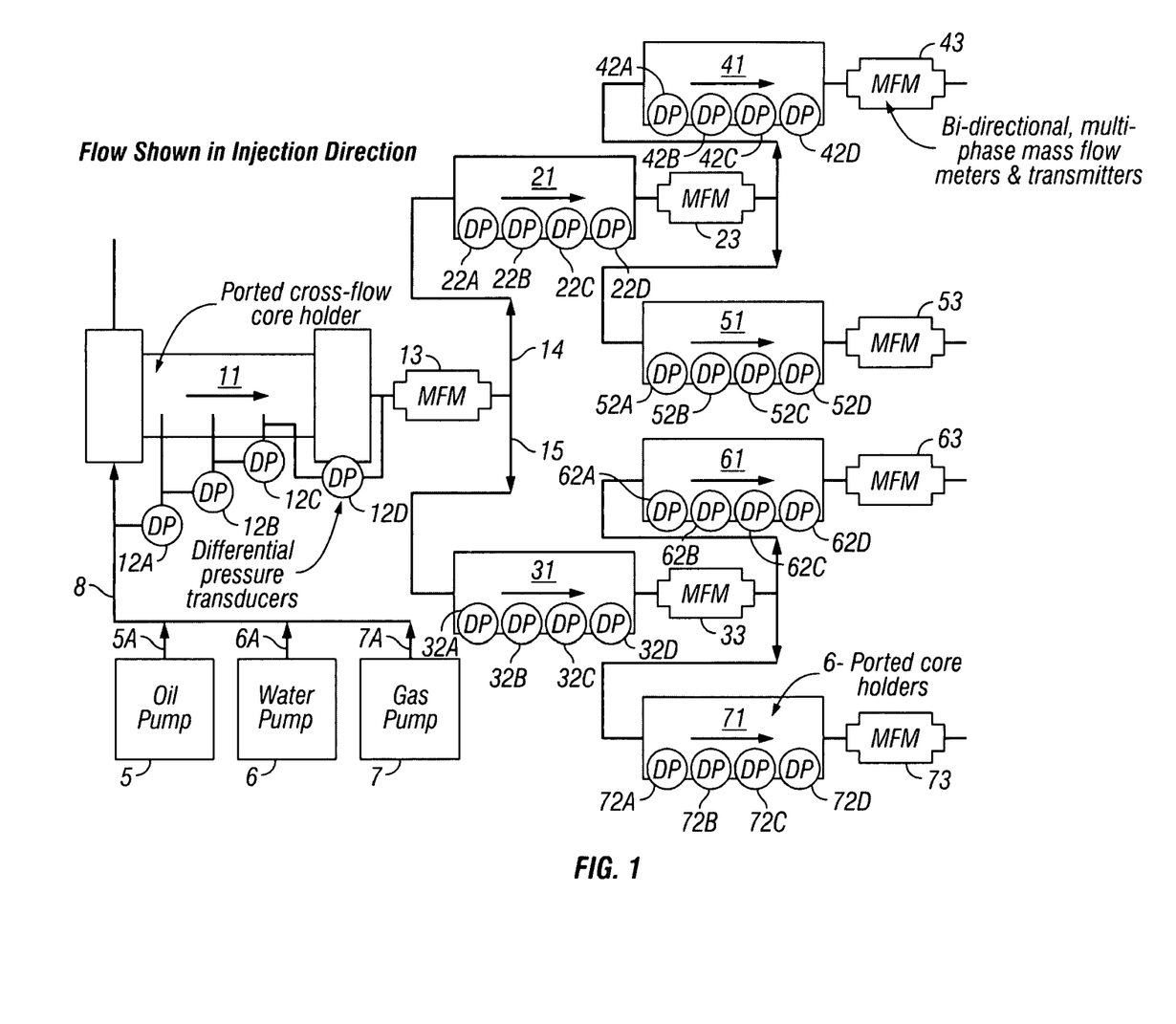
FIG. 1 is a side view illustrating the direction of injection flow of a test fluid sample using the inventive reservoir modeling technique.

Referring to FIG. 1, a side view showing the direction of injection flow, test core 10 is concentrically placed into a large cylindrical core flow holder 11. Fluid from oil pump 5, water pump 6 and/or gas pump 7 is pumped through line 8 into core flow holder 11 via lines 5A, 6A and 7A, respectively.

Core holder 11 is ported at intervals along its length. As drawn, three openings are placed equally along the length of the core (about every three to four inches for a core of 12 inch length). As depicted, distinct differential pressure transducers 12A, 12B and 12C are respectively placed over their respective opening and the pressure differential is measured. A fourth differential pressure transducer 12D is placed at the exit port of the core holder. Fluids are then pumped across the face of core 10 while material is leaked through the core. As the fluid flows across the face of core 10, the differential pressure creates the build-up of a mud cake from the fluid flow onto the face of the core. This, in turn, simulates reservoir conditions during the drilling operation.

Upon exiting from test core 10, the fluid process through mass flow meter 13 which measures the rate of the fluid exiting from core holder 11. The fluid stream is then partitioned through flow lines 14 and 15 into core holder 21 and 31, respectively. Core holders 21 and 31 house cores 20 and 30, respectively. Each of core holders 21 and 31 has four differential pressure transducers equally (22A, 22B, 22C and 22D; and 32A, 32B, 32C and 32D, respectively) spaced along their length. The effluent from each of cores 20 and 30 then flows through mass flow meters 23 and 33, respectively.

The fluid exiting from mass flow meter 23 is then partitioned into two additional core holders 41 and 51 which house cores 40 and 50, respectively. The fluid exiting from mass flow meter 33 may further be partitioned into additional core holders 61 and 71 which house cores 60 and 70, respectively. Each of core holders 41, 51, 61, and 71 is equipped with four differential pressure transducers equally spaced along the length of the core holder. These correspond to transducers 42A, 42B, 42C and 42D for core holder 41; transducers 52A, 52B, 52C and 52D for core holder 51; transducers 62A, 62B, 62C and 62D for core holder 61; and transducers 72A, 72B, 72C and 72D for core holder 71.

Upon exiting from each of test cores 40, 50, 60 and 70, the fluid process through mass flow meters 43, 53, 63 and 73, respectively; each of which measures the rate of the fluid exiting from the respective core. Data acquisition from each of the mass flow meters is then compared and verified for mass balance as a check of the system (i.e. total mass in is equal to total mass out).

Unlike core holder 11, core holders 21, 31, 41, 51, 61 and 71 are preferably parallel, versus cross-flow, core holders. Parallel core holders do not allow fluids to be pumped across the core face in a perpendicular flow pattern (normal to the core face) and principally serve to increase the surface area to which the fluid is exposed. The fluids therefore travel parallel to the core holders, through the cores.

Since each layer of reservoir is simulated by doubling the cross-sectional area available for flow of treatment fluids, the fluid flow model of the invention is closely analogous to a true radial flow model. A true radial model would have increasing core diameter as a function of distance traversed along the longitudinal axis. A true radial model of this nature would be impractical to use, and even more difficult to build. The fluid flow model of the invention approximates the results of a true radial model, while still using core materials actually available in practice.

Thus, as depicted in FIG. 1, fluid is flowed through a total of seven cores. The diameter of each of the cores preferably remains the same. The resultant is analogous to a true radial flow model since the diameter of the cores remains unchanged. The model presents a reasonable simulation of an in-situ radial flow path. The model will predict lower volumes than are really required in practice, because of the constant diameter cores, but that factor can be compensated for when final volumes are calculated. As such, the model may be referred to as a "pseudo-radial flow model."

The inventive model is analogous to an in-situ radial flow path since the surface area increases with increasing radius in each distinct core zone though the surface area is constant in each zone. Thus, the fluid flow model of the invention renders an accurate approximation of likely radial flow conditions in-situ.

Figure 2:
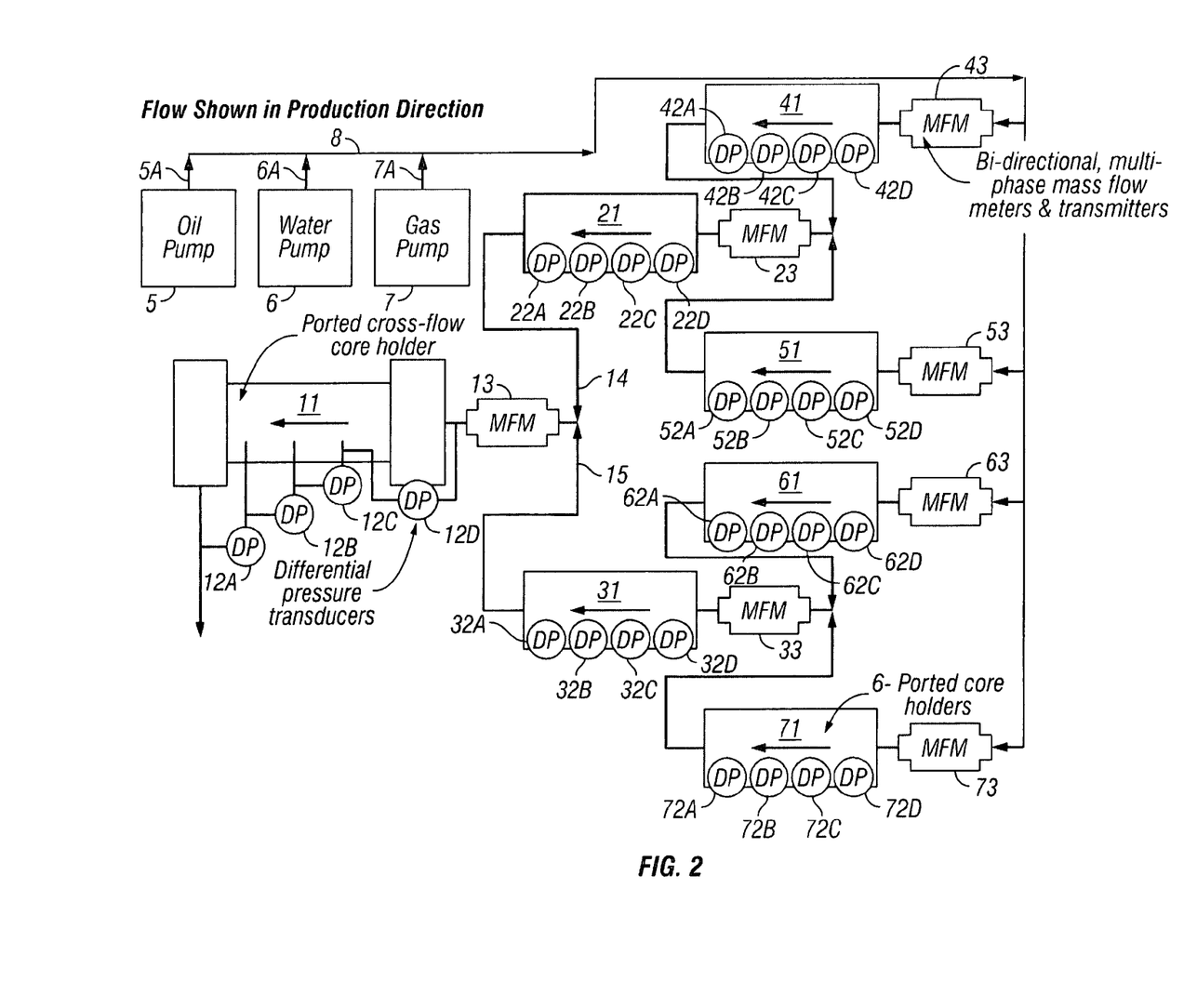
FIG. 2 is a side view illustrating the production direction of injection flow of a test fluid sample in accordance with the invention.

FIG. 2 is a side view illustrating the flow in production direction wherein the fluid from oil pump 5, water pump 6 and/or gas pump 7 is pumped through mass flow meters 5A, 6A and 7A into core holders 80, 90, 100 and 110, respectively. The rest of the procedure is the reverse of that illustrated in FIG. 1, each of the mass flow meters of FIG. 1 being capable of dual directional flow.

The invention is applicable with gases and liquids as well as multi-phase systems. In a preferred mode of operation, no more than two phases are pumped concurrently.

Figure 3:
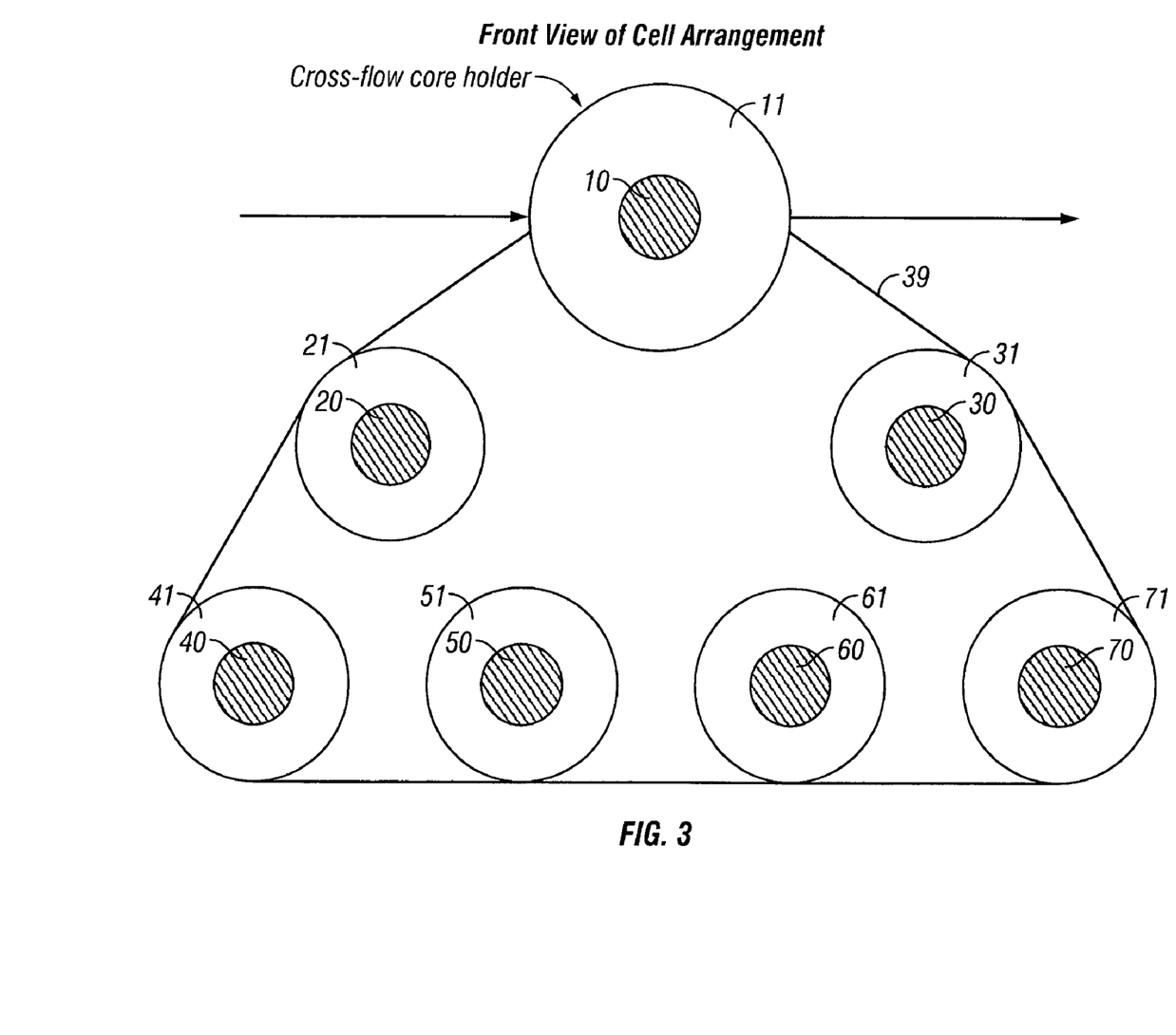
FIG. 3 is a front view of the multi-cell fluid flow assembly of the inventive reservoir modeling technique.

FIG. 3 illustrates the front view of the cell arrangement with cores 10, 20, 30, 40, 50, 60 and 70 in each of core holders 11, 21, 31, 41, 51, 61 and 71, respectively. The core holders are secured into the illustrated arrangement such that the arrangement is capable of being turned at any angle, horizontally and/or vertically. The entire cell arrangement may be housed in a large temperature chamber 39, allowing all of the testing to be conducted at elevated temperatures simulating downhole conditions.

Figure 4:
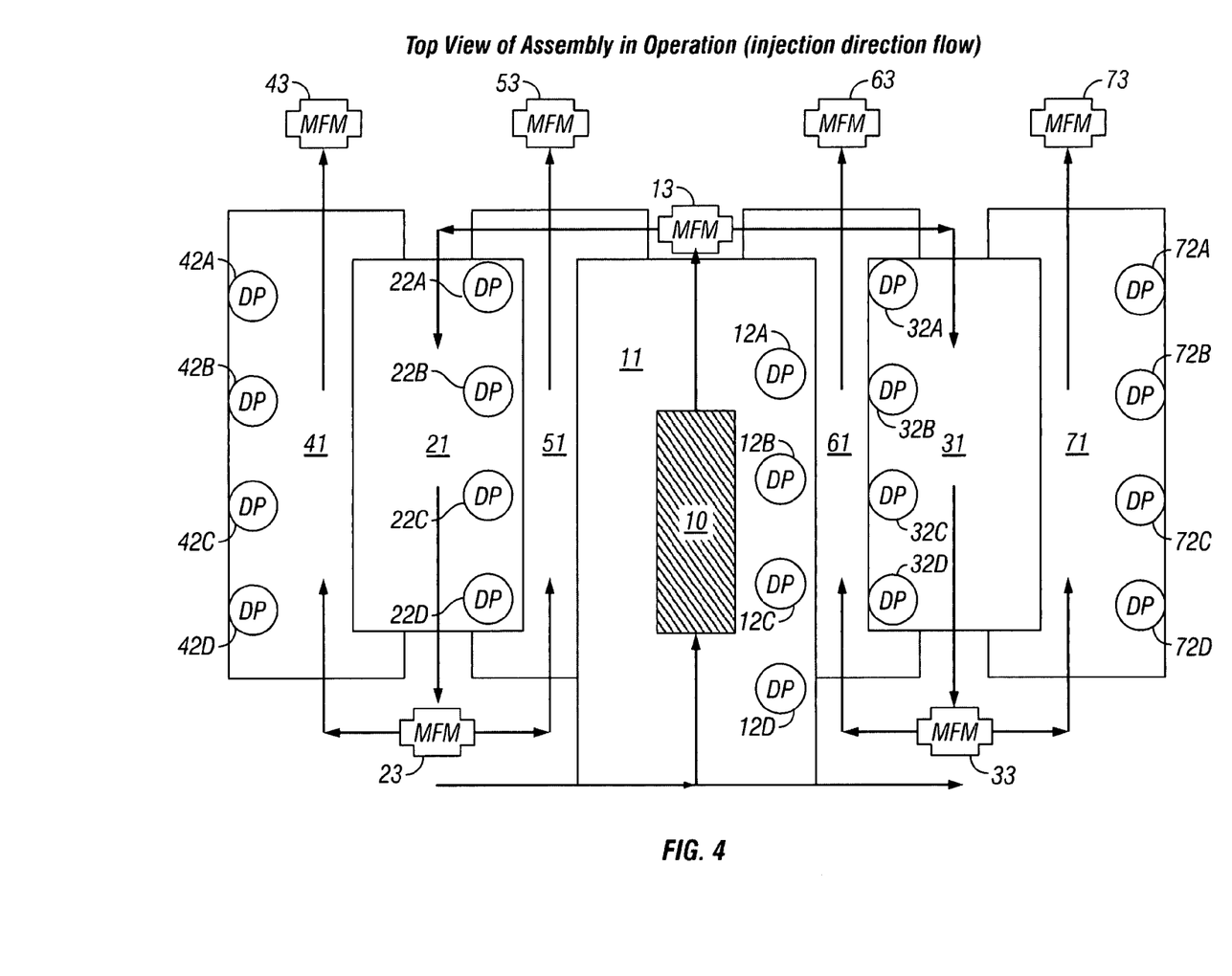
FIG. 4 is a top view of the fluid flow cell assembly of the invention in operation and depicts the injection direction flow.
Figure 5:
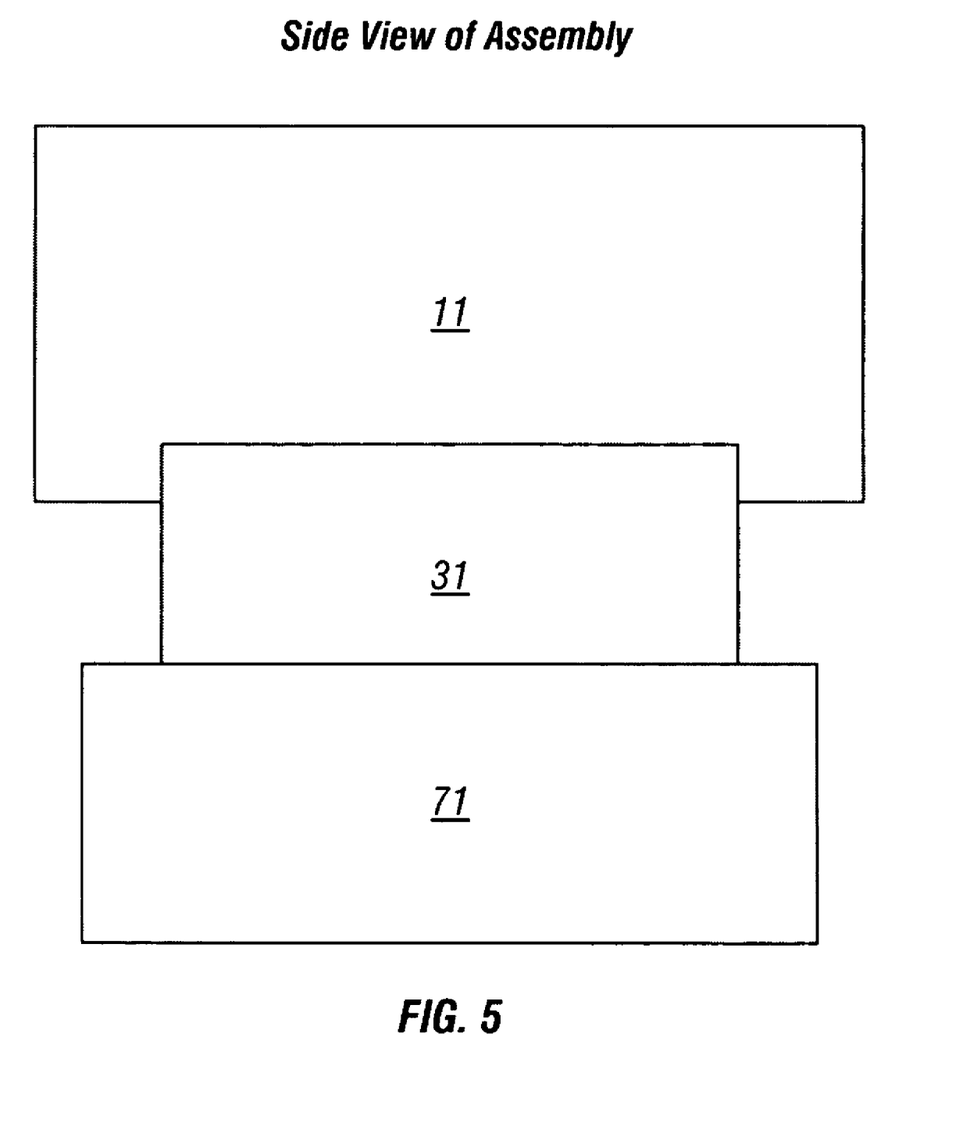
FIG. 5 is a side view of the multi-cell fluid flow assembly of the invention.

FIG. 4 is a top view of the assembly in operation showing the injection direction flow. FIG. 5 is a side view of the core testing assembly. All core holders are rigidly connected during testing. This allows testing to be conducted at any desired angle between horizontal and vertical. The entire assembly is housed in a large temperature chamber, which allows the testing to be conducted at any desired temperature as well. Thus, during operation, the assembly may be arranged at the desired angle.

Figure 6:
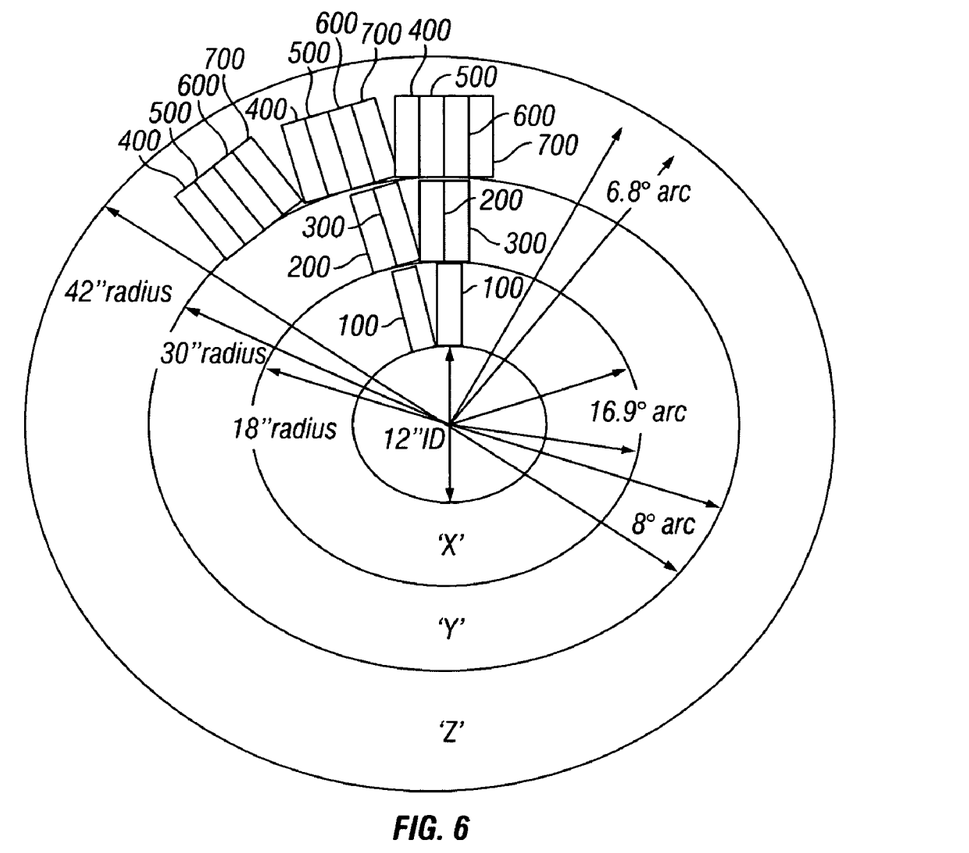
FIG. 6 is a cross-sectional view of a typical reservoir which might be modeled using the invention.

An exemplary fluid flow methodology of the invention as it applies to a typical hydrocarbon bearing reservoir in accordance with the invention is illustrated in FIG. 6 (not drawn to scale) wherein the view illustrated is representative of the viewer looking longitudinally down the axis of the wellbore. The concentric circles in FIG. 6 depict three sections of the reservoir surrounding a 12" diameter drilled wellbore. Each of the concentric circles represents a core zone wherein "X" represents the primary core zone, "Y" represents the secondary core zone and "Z" represents the tertiary core zone. Each zone has a radius that is 12" larger than its adjacent section. For instance, where the drilled hole is 12" in diameter, the core zones have radii of 18" (primary core zone), 30" (secondary core zone) and 42" (tertiary core zone), respectively. While no metal casing is illustrated, it is understood that a cased hole system could also be simulated.

Figure 7:
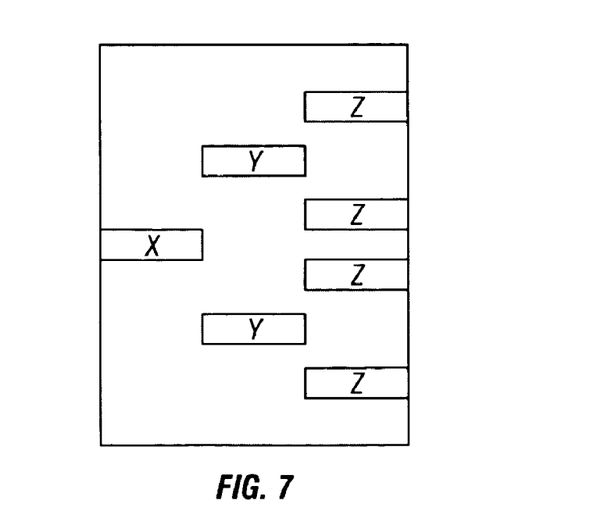
FIG. 7 is the schematic core holder layout for the modeling set forth in FIG. 6.

The figure illustrates what each of the cores would represent in the targeted reservoir. The primary core zone of FIG. 6 uses only core modeling core 100 to model the behavior of core zone X. The secondary core zone use modeling cores 200 and 300 to simulate the next segment of cylinder Y. Finally, the tertiary core zone uses modeling cores 400, 500, 600 and 700. The schematic core holder layout is set forth in FIG. 7.

Assuming the objective is to predict the amount of treatment fluid needed for a 12 inch inner diameter wellbore, Table I illustrates the core methodology of the invention using a 2 inch outer diameter core for the primary, secondary and tertiary zones depicted in FIG. 6.

TABLE 1

| | Core Diameter, inches | Core Area, in² | Total Treated Area, in² | Square root of total treated area (in inches) |
|---|---|---|---|---|
| x-section core 1 - Zone 'X' | 2 | 3.14 | 3.14 | 1.77 |
| x-section core 2 - Zone 'Y' | 2 | 3.14 | | |
| x-section core 3 - Zone 'Y' | 2 | 3.14 | 6.28 | 2.51 |
| x-section core 4 - Zone 'Z' | 2 | 3.14 | | |
| x-section core 5 - Zone 'Z' | 2 | 3.14 | | |
| x-section core 6 - Zone 'Z' | 2 | 3.14 | | |
| x-section core 7 - Zone 'Z' | 2 | 3.14 | 12.57 | 3.54 |

Figure 6A:
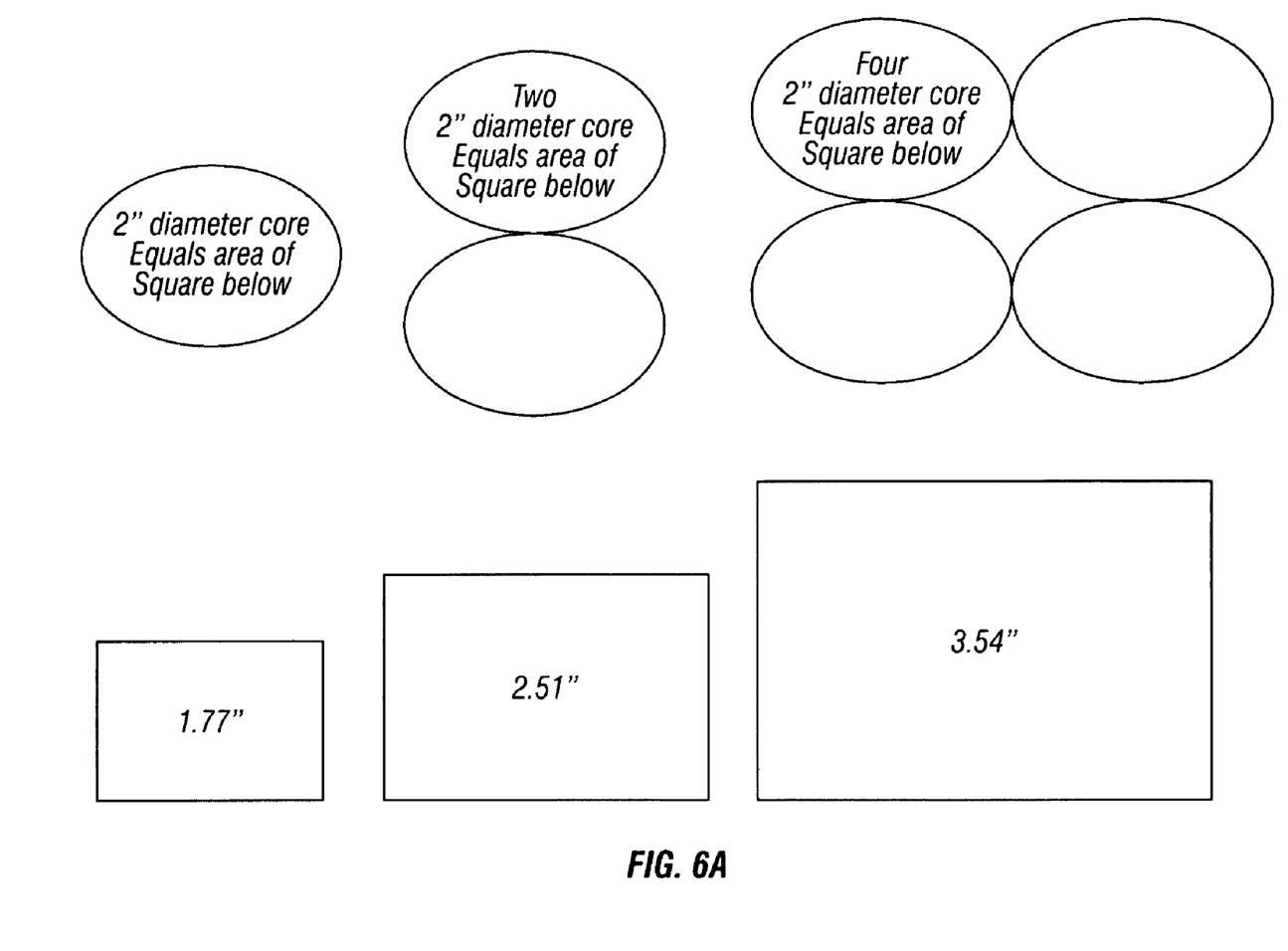
FIG. 6A illustrates the relative sizes of the treated area of the model of FIG. 6.

FIG. 6A represents the relative sizes of the treated area as though they were converted from cylinders into squares. The numbers represent the dimension (in inches) of the sides of the square blocks of reservoir rock. In this way, square blocks of rock representing the reservoir could be laid like bricks into the configuration shown in FIG. 6 to allow for calculation of the radial flow values illustrated in Table 2.

Assuming the methodology is for a 12" core length, Table 2 illustrates calculation of the multipliers required to complete each zone:

TABLE 2

Assuming a 12" hole is drilled into the reservoir

| Radius of Zone (in inches) | Circumference of various radii (in inches) | Treated area square Dimension (in inches) | Effectively swept arc (in degrees) | Radial multiplier value |
|---|---|---|---|---|
| Zone 'X' 6 | 37.70 | 1.77 | 16.9 | 21.30 |
| Zone 'Y' 18 | 113.10 | 2.51 | 8.0 | 45.12 |
| Zone 'Z' 30 | 188.50 | 3.54 | 6.8 | 53.17 |

The small triangles, e.g., the triangle between core 400 and 700 of the tertiary zone, in FIG. 6 illustrate the degree which the inventive model deviates from a true radial flow model.

The designated arcs represent a portion of the reservoir. For instance, the primary core zone is characterized by a 16.9° (1.77/37.70×360°) arc. The multiplier thus of the primary core zone is 21.27 (16.9×21.27=360°, a full circle). Using this information, the scale-up of acid needed for an acidizing job of a 12" inner diameter wellbore may be estimated.

An exemplary process for estimating total acid required to stimulate a zone could consist of establishing a core flow model assembly with seven fresh cores, such as, as set forth in FIG. 6, a primary core zone containing one core; a secondary core zone containing two cores and a tertiary core zone containing four cores. Each of the cores could then be flooded with a reactive treatment fluid. The treatment fluid effluent from the cores from the tertiary zone could be monitored for reactivity, until such time as reactive fluids are found in abundance. The volume of fluid would be noted at that point in time. Calculations could then be made to determine the quantity of treatment fluid required by the actual reservoir.

For instance, 1 gallon of reactive fluid may be injected into the flow setup, at which point, reactive fluids would be noted at the effluent end of the tertiary cores. Using the model set forth in FIG. 6, the largest radial multiplier value of 53.17 would overestimate the total acid required to achieve equivalent radial penetration distance in the actual reservoir. To calculate the required volume of reactive fluid when using the largest radial multiplier value, one would use the square root of the area covered by the tertiary cores (3.54") to determine the volume of acid required to treat one linear foot of reservoir. The linear footage multiplier would equal 12"/3.55"=3.39. The total volume per foot of zone would be calculated as 53.17×3.39=180.24 gallons/foot of zone of reactive fluid required to treat one linear foot of reservoir to a depth of penetration of 42". Total job volume would then be obtained by multiplying the total linear footage of the zone of interest by the volume factor of 180.24 gallons/foot of zone. The resulting volume would be the total required to treat the zone of interest.

In another variant, the cores of contiguous zones may be characterized by increasing diameter. Likewise, the core holders of contiguous zones may be characterized by increasing inner diameter. In practice, this model, in some circumstances, may be more predictable of volumes of treatment fluid actually required in the field.

Figure 8:
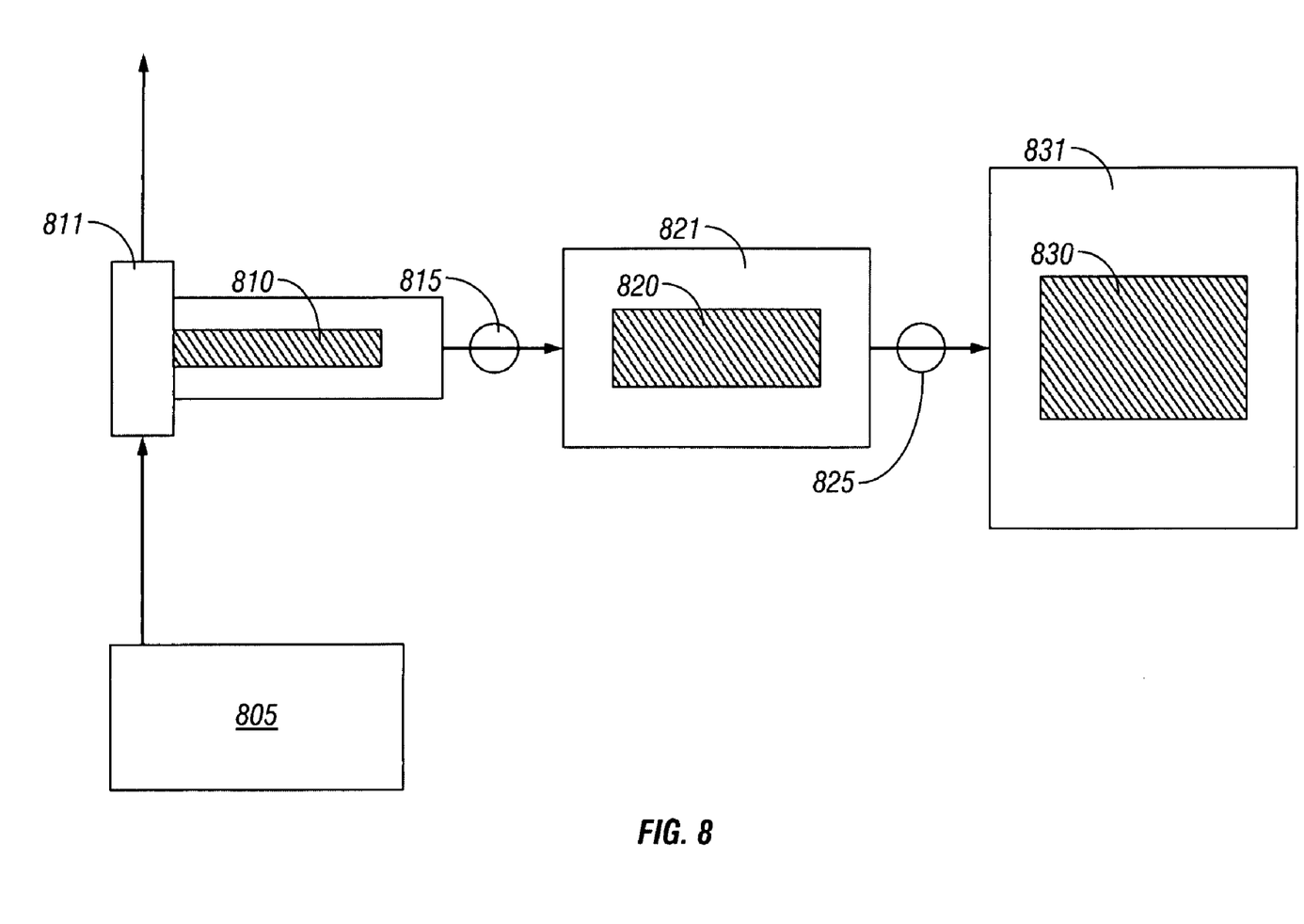
FIG. 8 is a side view illustrating an alternative embodiment of the invention using single core holders wherein the cores of contiguous zones have different diameters.

Referring to FIG. 8, this fluid flow model may contain fluid pump 805 for introduction of the treatment fluid into the single core zone holder. The fluid enters primary core zone 810 in primary cross-flow core holder 811 of specified diameter, such as 1 inch. The diameter of secondary core zone 820 in core holder 821 would then be greater than the diameter of core 810. For instance, where the diameter of core 810 is 1 inch, the diameter of core 820 may be 2 or 4 inches. The tertiary core 830 within core holder 831 would then have a diameter of greater size than the diameter of secondary core zone 820. For instance, the diameter of tertiary core 830 may be 6 to 8 inches or greater. The primary core zone would be connected by serial flow path 815 to secondary core 820 which would, in turn, be connected by serial flow path 825 to tertiary core 830. Calculations could then be made consistent with those above having a constant diameter.

Figure 9:
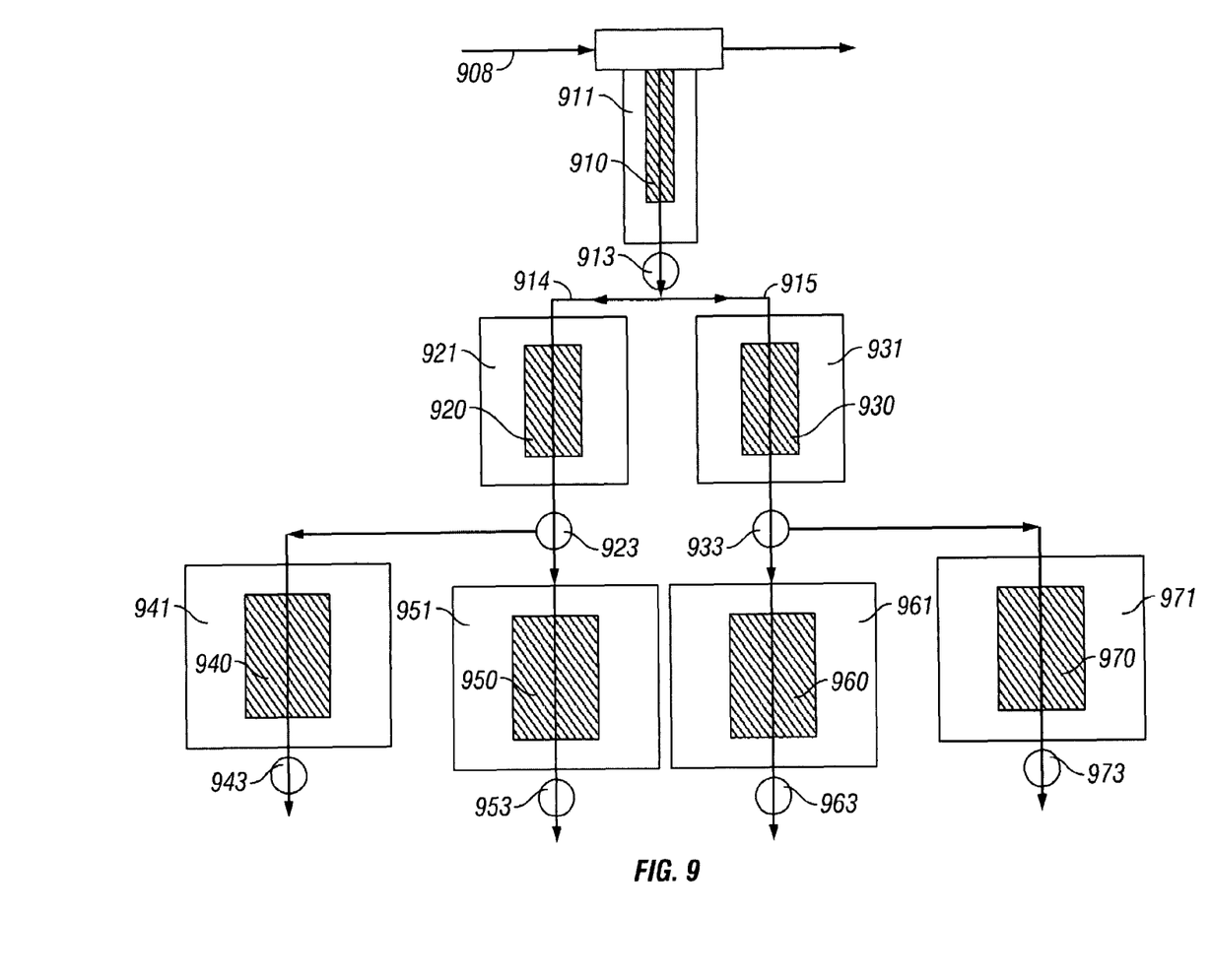
FIG. 9 is a side view illustrating another alternative embodiment of the invention using a radial flow model wherein the cores of contiguous zones have different diameters.

FIG. 9 is a further embodiment of the invention wherein the fluid flow model of the invention is closely analogous to a true radial flow model. Referring to FIG. 9, a side view showing the direction of injection flow, core 910 is concentrically placed into cylindrical core flow holder 911. Fluid from the pump is pumped through line 908 into core flow holder 911 and material is leaked through the core. As the fluid flows across the face of core 910, the differential pressure creates the build-up of a mud cake from the fluid flow onto the face of the core. This, in turn, simulates reservoir conditions during the drilling operation.

Upon exiting from test core 910, the fluid process through mass flow meter 913 which measures the rate of the fluid exiting from core holder 911. The fluid stream is then partitioned through flow lines 914 and 915 into core holder 921 and 931, respectively. Core holders 921 and 931 house cores 920 and 930, respectively. Secondary cores 920 and 930 have a diameter greater than the diameter of the primary core holder 910. For instance, the diameter of the primary core 910 could be 1 inch whereas the diameter of each of the secondary cores 920 and 930 could be between from about 2 to about 4 inches. The effluent from each of cores 920 and 930 then flows through mass flow meters 923 and 933, respectively.

The fluid exiting from mass flow meter 923 is then partitioned into two additional core holders 941 and 951 which house cores 940 and 950, respectively. The fluid exiting from mass flow meter 933 may further be partitioned into additional cores 960 and 970 which are housed by core holders 961 and 971, respectively. The diameter of each of cores 940, 950, 960 and 970 is greater than the diameter of the secondary cores 920 and 930. For instance, the diameter of the tertiary cores 940, 950, 960 and 970 could be between from about 6 and about 8 inches and could even be greater than 8 inches.

Upon exiting from each of test cores 940, 950, 960 and 970, the fluid process through mass flow meters 943, 953, 963 and 973, respectively; each of which measures the rate of the fluid exiting from the respective core. Calculations could then be made consistent with those above having a constant diameter.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A fluid flow model comprising:
   (a) a primary core zone;
   (b) a secondary core zone comprising at least two secondary cores; and
   (c) a tertiary core zone comprising at least two tertiary cores for each secondary core
wherein each of the cores in the primary core zone, secondary core zone and tertiary core zone is connected by a combination of serial and parallel flow paths.

2. The fluid flow model of claim 1, wherein the tertiary core zone contains four cores.

3. The fluid flow model of claim 1, wherein each of the cores in the primary core zone, secondary core zone and tertiary core zone is within a core holder and further wherein each of the core holders is independently approximately 8 inches or less.

4. The fluid flow model of claim 3, wherein the diameter of the core in each of the primary core zone, secondary core zone and tertiary core zones is approximately the same.

5. The fluid flow model of claim 1, wherein the diameter of the cores in the secondary core zone is greater than the diameter of the core in the primary core zone and further wherein the diameter of the cores in the tertiary core zone is greater than the diameter of the cores in the secondary core zone.

6. The fluid flow model of claim 1, wherein the model is capable of predicting requisite volumes of treatment fluid for a reservoir.

7. The fluid flow model of claim 1, wherein the length of each of the cores in the primary core zone, secondary core zone and tertiary core zone is independently approximately 12 inches or less.

8. A fluid flow model comprising:
   (a) a primary core zone comprising a cross-flow core holder;
   (b) a secondary core zone comprising at least two core holders; and
   (c) a tertiary core zone comprising greater than two core holders wherein each of the core holders in the primary core zone, secondary core zone and tertiary core zone is connected by a combination of serial and parallel flow paths.

9. The fluid flow model of claim 8, wherein the tertiary core zone contains four core holders.

10. The fluid flow model of claim 8, wherein the inner diameter of each of the primary core zone, secondary core zone and tertiary core zone core holders is each independently 8 inches or less.

11. The fluid flow model of claim 8, wherein the model is capable of predicting requisite volumes of treatment fluid for a reservoir.

12. The fluid flow model of claim 8, wherein the length of each of the core holders in the primary core zone, secondary core zone and tertiary core zone is independently 12 inches or greater.

13. The fluid flow model of claim 8, wherein each of the core holders in the secondary core zone and tertiary core zone is a parallel core holder.

14. A method of estimating the requisite volume of treatment fluid for a reservoir which comprises:
   (a) introducing a fluid into a primary core zone containing a primary core and allowing the fluid to flow through the primary core and leak material through the primary core by means of a cross-flow core holder;
   (b) injecting a treatment fluid into a primary core zone and permitting the treatment fluid to travel through and exit from the primary core;
   (c) partitioning the primary core exit fluid into at least two streams;
   (d) introducing the partitioned primary core exit fluid into a secondary core zone containing at least two secondary cores and permitting the fluid to travel through each of the secondary cores and exit there from;
   (e) partitioning the secondary core exit fluid from at least one of the secondary cores into at least two streams;
   (f) introducing the partitioned secondary core exit fluid into a tertiary core zone containing at least two tertiary cores; and
   (g) estimating the total volume of treatment fluid needed to flow from each of the primary, secondary and tertiary core zones.

15. The method of claim 14, wherein the diameter of each of the cores is independently 8 inches or less.

16. The method of claim 14, wherein the length of each of the cores is 12 inches or less.

17. The method of claim 14, wherein each of the secondary core exit fluids is partitioned into two streams and each of the streams is permitted to enter a distinct tertiary core.

18. The method of claim 14, wherein the treatment fluid is an acid.

19. The method of claim 14, wherein the treatment fluid is a water control agent.

20. The method of claim 14, wherein the primary core resides in a cross-flow core holder.

21. The method of claim 20, wherein each of the secondary cores and tertiary cores resides in parallel core holders.

22. The fluid flow model of claim 3, wherein the inner diameter in each of the primary core zone, secondary core zone and tertiary core zone core holders is 2 inches.

23. The method of claim 15, wherein the inner diameter in each of the primary core zone, secondary core zone and tertiary core zone is 2 inches.

24. A fluid flow model comprising:
 (a) a primary core having a cross-flow primary core holder of specified inner diameter;
 (b) a secondary core zone having a secondary core holder of inner diameter greater than the specified inner diameter of the primary core holder; and
 (c) a tertiary core zone having a tertiary core holder of inner diameter greater than the inner diameter of the secondary core holder wherein the primary core holder is connected by a serial flow path to the secondary core holder and further wherein the secondary core holder is connected by a serial flow path to the tertiary core holder.

25. The fluid flow model of claim 24, wherein the inner diameter of the core holder in the primary core zone is from about 1 to about 2 inches and the inner diameter of the secondary core holder is approximately two times the inner diameter of the primary core holder.

26. The fluid flow model of claim 25, wherein the model is capable of predicting requisite volumes of treatment fluid for a reservoir.

* * * * *

UNITED STATES PATENT AND TRADEMARK OFFICE
CERTIFICATE OF CORRECTION

PATENT NO. : 7,603,896 B2
APPLICATION NO. : 11/520549
DATED : October 20, 2009
INVENTOR(S) : Kalfayan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this

Fifth Day of October, 2010

David J. Kappos
*Director of the United States Patent and Trademark Office*